United States Patent
Yu et al.

(10) Patent No.: US 12,236,256 B2
(45) Date of Patent: Feb. 25, 2025

(54) CONTAINER PLATFORM-ORIENTED TRUSTED SOFTWARE AUTHORIZATION AND VERIFICATION SYSTEM AND METHOD

(71) Applicant: INSTITUTE OF INFORMATION ENGINEERING, CHINESE ACADEMY OF SCIENCES, Beijing (CN)

(72) Inventors: Aimin Yu, Beijing (CN); Jiangang Ma, Beijing (CN); Yue Wang, Beijing (CN); Dan Meng, Beijing (CN)

(73) Assignee: INSTITUTE OF INFORMATION ENGINEERING, CHINESE ACADEMY OF SCIENCES (CN)

( * ) Notice: Subject to any disclaimer, the term of this patent is extended or adjusted under 35 U.S.C. 154(b) by 576 days.

(21) Appl. No.: 17/602,683

(22) PCT Filed: Apr. 1, 2020

(86) PCT No.: PCT/CN2020/082667
§ 371 (c)(1),
(2) Date: Oct. 8, 2021

(87) PCT Pub. No.: WO2020/207306
PCT Pub. Date: Oct. 15, 2020

(65) Prior Publication Data
US 2022/0164214 A1    May 26, 2022

(30) Foreign Application Priority Data

Apr. 12, 2019 (CN) .......................... 201910293687.5

(51) Int. Cl.
*G06F 9/455* (2018.01)
*G06F 8/61* (2018.01)
(Continued)

(52) U.S. Cl.
CPC ............ *G06F 9/45558* (2013.01); *G06F 8/65* (2013.01); *G06F 21/51* (2013.01); *G06F 21/53* (2013.01);
(Continued)

(58) Field of Classification Search
None
See application file for complete search history.

(56) References Cited

U.S. PATENT DOCUMENTS

2003/0217265 A1* 11/2003 Nakano ............. G11B 20/0021
713/158
2014/0380031 A1* 12/2014 Jones .................... G06F 21/572
713/2
(Continued)

FOREIGN PATENT DOCUMENTS

| CN | 103761329 A | 4/2014 |
|---|---|---|
| CN | 105069353 A | 11/2015 |

(Continued)

OTHER PUBLICATIONS

International Search Report and Written Opinion, PCT Application No. PCT/CN2020/082667, Jul. 2, 2020, 10 pages incl. English Translation, SIPO.

(Continued)

*Primary Examiner* — Abu Zar Ghaffari
(74) *Attorney, Agent, or Firm* — Jaffery Watson Hamilton & DeSanctis LLP (57) ABSTRACT

The system provided in the present application includes a public key infrastructure builder, a container image identity builder, a signature list builder, a container image verifier, a signature list and user certificates loader, and a container program verifier. The method provided in the present application is capable of conveniently authorizing container images and software running in the container, and verifying (Continued)

the container images and programs in the container at the right time, so as to ensure that container images running on the container platform are trusted, and the software running in the container is also trusted, thereby improving the security of the container platform.

11 Claims, 4 Drawing Sheets

(51) Int. Cl.
*G06F 8/65* (2018.01)
*G06F 21/51* (2013.01)
*G06F 21/53* (2013.01)
*G06F 21/57* (2013.01)
*H04L 9/00* (2022.01)
*H04L 9/08* (2006.01)
*H04L 9/32* (2006.01)

(52) U.S. Cl.
CPC ............ *G06F 21/57* (2013.01); *H04L 9/0825* (2013.01); *H04L 9/0836* (2013.01); *H04L 9/3247* (2013.01); *H04L 9/3268* (2013.01); *H04L 9/50* (2022.05); *G06F 8/63* (2013.01); *G06F 2009/45587* (2013.01); *G06F 2009/45595* (2013.01)

(56) References Cited

U.S. PATENT DOCUMENTS

| | | | | |
|---|---|---|---|---|
| 2016/0294559 | A1* | 10/2016 | Dabak | G06F 9/45558 |
| 2017/0177877 | A1* | 6/2017 | Suarez | G06F 21/6218 |
| 2017/0180346 | A1 | 6/2017 | Suarez et al. | |
| 2017/0364685 | A1* | 12/2017 | Shah | G06F 21/575 |
| 2018/0034688 | A1 | 2/2018 | Lee et al. | |
| 2018/0068118 | A1* | 3/2018 | Vandergeest | G06F 21/55 |
| 2018/0211067 | A1* | 7/2018 | Costa | H04L 9/3247 |
| 2018/0248701 | A1* | 8/2018 | Johnson | H04L 9/3297 |
| 2018/0349610 | A1* | 12/2018 | Gupta | G06F 9/5077 |
| 2019/0102423 | A1* | 4/2019 | Little | G06Q 20/06 |
| 2019/0121986 | A1* | 4/2019 | Stopel | G06F 21/577 |
| 2019/0235897 | A1* | 8/2019 | Goel | G06F 9/45545 |
| 2019/0305963 | A1* | 10/2019 | Kopp | H04L 9/3263 |
| 2020/0021615 | A1* | 1/2020 | Wainner | G06F 8/71 |
| 2020/0310775 | A1* | 10/2020 | Nyamars | G06F 8/60 |

FOREIGN PATENT DOCUMENTS

| | | |
|---|---|---|
| CN | 107239688 A | 10/2017 |
| CN | 107577937 A | 1/2018 |
| CN | 108509250 A | 9/2018 |
| CN | 108733455 A | 11/2018 |
| CN | 110069921 A | 7/2019 |
| JP | 2019056986 A | 4/2019 |

OTHER PUBLICATIONS

Kong Tong et al., "Design of a Container-Based Security Cloud Computing Platform," 2017, 9 pages incl. English Abstract.
D. Merkel, "Docker: lightweight [[linux]]Linux™ containers for consistent development and deployment," [[Linux]] Linux™ J., vol. 2014, No. 239, p. 2, 2014.
["The Update Framework." [Online]. Available: https://theupdateframework.github.io/. [Accessed: Jun. 25, 2024].
N. Bila, P. Dettori, A. Kanso, Y. Watanabe, and A. Youssef, "Leveraging the serverless architecture for securing [[Linux]]Linux™ containers," in Distributed Computing Systems Workshops (ICDCSW), 2017 IEEE 37th International Conference on, 2017, pp. 401-404.].
R. Sailer, X. Zhang, T. Jaeger, and L. Van Doorn, "Design and Implementation of a TCG-based Integrity Measurement Architecture.," in USENIX Security symposium, 2004, vol. 13, pp. 223-238.
[[Linux]]Linux™ security modules (LSM) [J. Morris, S. Smalley, and G. Kroah-Hartman, "[[Linux]]Linux™ security modules: General security support for the [[Linux]]Linux™ kernel," in USENIX Security Symposium, 2002.].
Stefan Berger, "[RFC Patch v4 0/5] ima: Namespacing IMA," [[Linux]]Linux™ Kernel Mailing List. [Online]. Available: https://lkml.org/lkml/2018/5/11/383. [Accessed:Jun. 25, 2024].

\* cited by examiner

| Hash value | Name | Signature |
|---|---|---|
| 611a59c515074dbb376713fd19040c10a0c8e5e2 | /bin/bash | kgl46y2cNn...YyHg== |
| 79e52322102f073684e2dd0ab7653c7c6fcc49b4 | /bin/cat | ZCol13WDn...Olcg== |
| 56d992a0342a67a887b8dcaae381d2cc51205253 | /lib/···/libc.so.6 | WM79x...9Tlw== |
| ... | | |

CONTAINER PLATFORM-ORIENTED TRUSTED SOFTWARE AUTHORIZATION AND VERIFICATION SYSTEM AND METHOD

CROSS-REFERENCE TO RELATED APPLICATION

The present application claims priority to Chinese application No. 2019102936875 filed on Apr. 12, 2019, entitled "container platform-oriented Trusted Software Authorization and Verification System and Method", which is hereby incorporated by reference in its entirety.

FIELD OF TECHNOLOGY

The present application relates to a container platform-oriented trusted software authorization and verification system and method in the field of cloud computing and information security.

BACKGROUND

Figure 1:
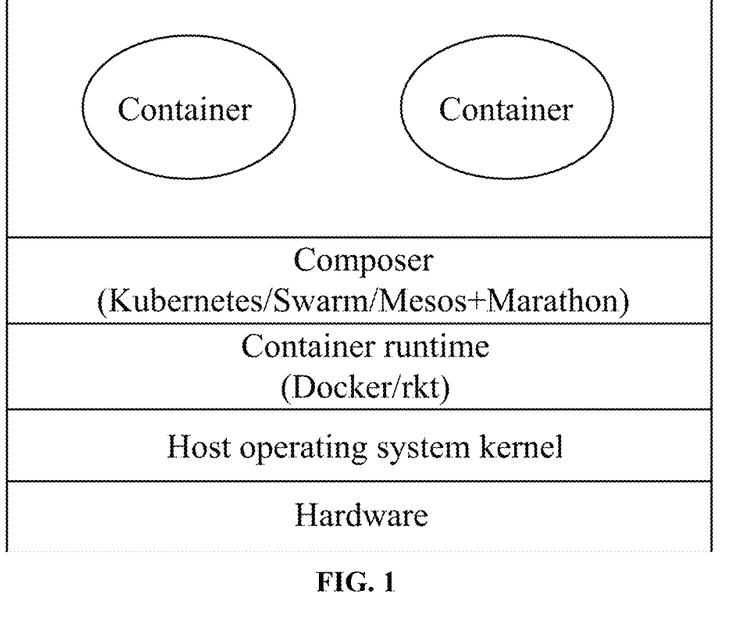
FIG. 1 shows a hierarchical model of a container platform.

Container technology has mushroomed rapidly ever since the release of Docker [D. Merkel, "Docker: lightweight Linux™ containers for consistent development and deployment," Linux™ J., vol. 2014, no. 239, p. 2, 2014.] in 2013. The container technology is adopted to package relevant software into a container image, instantiate the container image in an isolated environment, and then startup the container. The software in the container runs directly in host operating systems without a virtualization layer therebetween, so it runs more efficiently. In addition, as the proliferation of container ecosystems, more and more tools thereof are becoming commercially available, which facilities the widespread use of containers; and more and more organizations and enterprises are beginning to build their own container platforms to manage business. A hierarchical model of the container platform is shown in FIG. 1 and includes a hardware, a host operating system kernel, a container runtime, and a composer from bottom to top. The container runtime is responsible for managing containers on a host, including providing the container operating environment and managing the life cycle of the container. The composer works at a cluster level and is responsible for managing containers at a container group level. The composer has functions of container scheduling, cluster status monitoring, and service discovery. The container platform allows users to autonomously create, manage and destroy containers to complete specific tasks.

With the widespread popularity of container platforms, it is important to avoid trustless programs running in containers. For containers, container images may be tampered with and contain trustless or even malicious software; running containers may access malicious websites and download malicious programs to run. Therefore, container platform-oriented trusted software comprises two parts: one being container images on which the container runs, and the other being software running in the container.

Regarding protection for container images, Docker ensures the security of the Docker image from the publisher to the consumer based on Notary ["Getting started with Docker Notary, "Docker Documentation, 8 Nov. 2018.]. Notary defines many roles and metadata using the Update Framework (TUF) [" The Update Framework."], and protects Docker images using digital signature algorithms, which may resist a variety of attacks, including image tampering, version rollback attacks, and replay attacks. Another container engine rkt ["rkt Overview."] also provides verification of container images, which may verify the source and integrity of container images when the container images are downloaded or run using digital signature algorithms.

Regarding the protection for software running in the container. Integrity Measurement Architecture (IMA) [R. Sailer, X. Zhang, T. Jaeger, and L. Van Doorn, "Design and Implementation of a TCG-based Integrity Measurement Architecture.," in USENIX Security symposium, 2004, vol. 13, pp. 223-238.] is adopted to measure the integrity of the software running in the operating system in a hook of Linux™ security modules (LSM) [J. Morris, S. Smalley, and G. Kroah-Hartman, "Linux™ security modules: General security support for the Linux™ kernel," in USENIX Security Symposium, 2002.] and may ensure the trustworthiness of the software running in the system based on the extended attributes stored in the file system. Since IMA works at an operating system layer and cannot see the container, a namespacing scheme for IMA is proposed in a Linux™ kernel mailing list [Guilherme Magalhaes," [RFC 00/11] ima: namespace support for IMA policy," Linux™ Kernel Mailing List.], [Mehmet Kayaalp, "[RFC PATCH 0/5] ima: namespacing IMA audit messages," Linux™ Kernel Mailing List.], [Stefan Berger," [RFC PATCH v4 0/5] ima: Namespacing IMA," Linux™ Kernel Mailing List.]. These solutions have many problems, such as regarding key management and cache design, but it can be foreseen that there will be more mature IMA Namespacing solutions in the Linux™ kernel community in the future. For the possible security issues of running containers, IBM has proposed a scanning scheme [N. Bila, P. Dettori, A. Kanso, Y. Watanabe, and A. Youssef, "Leveraging the serverless architecture for securing Linux™ containers," in Distributed Computing Systems Workshops (ICDCSW), 2017 IEEE 37th International Conference on, 2017, pp. 401-404.]. In the scheme, running containers were periodically scanned and security issues such as execution of malwares in the running containers were discovered through analysis. IBM implemented this solution using a serverless architecture.

The current container engine has the following shortcomings with respect to verification for container images:
  (1) Different container engines have different authorization and verification schemes for container images, and there is no uniform method.
  (2) In the current schemes, container image and metadata such as a signature are separated, and metadata needs to be transmitted additionally, which results in poor compatibility.
  (3) Since all the current schemes are selective rather than mandatory, malicious users can easily bypass the verification through the command line of the container runtime.

There are the following shortcomings in the current verification of running programs in containers:
  (1) At present, IMA verification cannot use different verification strategies for different containers.
  (2) Even if the Namespacing scheme of IMA can be completed, the verification is performed based on digital signatures stored in the extended attributes of the file system, which leads to inconvenient use, difficult modification and management.
  (3) Even if the Namespacing scheme of IMA can be completed, the verification is performed based on digital signatures stored in the extended attributes of the file system, and it is impossible to process a case where different container images share host files, such as Docker images hierarchically sharing host files.

(4) The scanning process periodically scans the container to find security problems, and cannot prevent trustless programs from running in advance, which is not secure enough.

SUMMARY

The present application provides a secure, efficient, and easy-to-use container platform-oriented trusted software authorization and verification system and method capable of conveniently authorizing container images and software running in the container, as well as verifying the container images and programs in the container at the right time, so as to ensure that container images running on the container platform are trusted, and the software running in the container is also trusted, and thereby improving the security of the container platform.

The technical solution of an embodiment of the present application is a container platform-oriented trusted software authorization and verification system, including: a public key infrastructure builder, a container image identity builder, a signature list builder, a container image verifier, a signature list and user certificates loader, and a container program verifier, wherein:

the public key infrastructure builder is configured to build a public key infrastructure, and issue a user certificate-key pair for each user according to different application scenarios;

the container image identity builder is configured to generate container images having identities with the same functions based on the original container image using a digital signature algorithm and the user certificate-key pair and push the container images to a container image repository for use, wherein each identity includes a user certificate and an original container image signature generated by the user's private key and subsequently, a container platform will pull the container images from the image repository to start the container;

the signature list builder is configured to generate a signature list for the container image using a digital signature algorithm and the user certificate-key pair and upload the signature list to the container platform; the signature list containing programs capable of being run by the container based on the container image;

the container image verifier is configured to verify the identity of the container image to ensure the trustworthiness of the container image when the container is created; and suspend the creation process of the container when the verification fails;

the signature list and user certificates loader is configured to, load the signature list for the container image and a user certificate of a container image producer into an operating system kernel as programs inside the container for verification when the container is started; and the container program verifier is configured to verify programs inside the container based on the loaded signature list and user certificate after loading the programs capable of being run by the container based on the container image and before the programs run, and suspend the running of the programs when the verification fails.

In the public key infrastructure builder, the building a public key infrastructure, and issuing a user certificate-key pair for each user includes: building, according to different application scenarios, different certificate key trees in which a root is a self-signed certificate, and leaf nodes are user certificates; between the root and the leaf nodes, there are a plurality of layers corresponding to different management levels in reality; except for the root, the certificates of each layer are issued by an upper layer; organizations of different management levels decide to issue and revoke certificates of the next level in the organization to facilitate management.

All the private keys in the certificate key tree are offline to ensure the security of the private keys.

The specific process of the container image identity builder is as follows.

(1) For each container image, an identity of the container image is built to complete the authorization of the container image; the identity of the container image includes two parts, one being signatures for the content of the container image and important configuration by a user using the user's own private keys; the important configuration includes environment variables, ports, startup commands, startup parameters, data volume, working directory, user ID; and the other being the user's certificate, wherein the signature contains the integrity information on the container image, and the certificate contains the information on the container image producer. The two parts together constitute the identity of the container image; and (2) The container image is unchangeable. In order to bind the identity of the container image to the container image, the original container image, signature and certificate need to be packaged to obtain a new container image, and the signature and certificate are put in a predetermined directory of the new container image, and thus the new container image has the same functions and important configuration as the original container image, and also has image identity information.

The process of building the identity of the container image is applicable to both layered and non-layered images.

In the signature list builder, for each container image, a signature list is generated to complete the authorization of the container program; the list contains all the programs capable of being run in the container based on the container image; for each program authorized to be run, the user uses his own private key to calculate the signature of the program file and put the signature into the signature list; each item in the signature list represents a program, and each item includes, but is not limited to, program signature, program hash value, and program name.

The program signature is represented using a variety of representation methods including binary, base64 encoding, and hexadecimal character strings.

In the container image verifier, the verification of the container image is performed when the container is created. The verification process includes three steps: a first step, verifying whether a certificate carried by the image belongs to the certificate key tree of the container platform, continuing to a second step of verification when the certificate carried by the image belongs to the certificate key tree of the container platform, and determining that the verification fails when the certificate carried by the image does not belong to the certificate key tree of the container platform; a second step, verifying a signature carried by the image using the certificate on which the verification passes in the first step, wherein the content in the predetermined directory needs to be excluded during this step of verification; and a third step, verifying the content in the predetermined directory to ensure that the directory only contains two files, namely a certificate and a signature file; the two steps above are used for verifying the integrity of the container image and ensure that the content and configuration of the container image have not been tampered. To speed up the verification of the container image, the hash value maintained by the container engine may be used.

In the signature list and user certificates loader,
the loading of the signature list and certificate is performed only when the verification of the container image passes before all the programs in the container run when the container is started, wherein the startup of the container occurs after the container is created;

both signature list and certificate are loaded from a user space into a kernel space and written through a file system; when data are loaded using the file system, data write points should be placed in a directory that only the host may access, thereby avoiding that the signature list or certificate is tampered by a malware in the container; and the timing of writing the signature list and certificate should be prior to the conversion of a host file system to a container file system.

In a kernel, a plurality of data structures are used to organize the signature list, and the data structures include a linked list, a doubly linked list, a hash table, a red-black tree, and a radix tree.

When a user certificate is loaded, it is necessary to verify the legality of the user certificate, that is, to verify whether the certificate belongs to the certificate key tree of the container platform. Therefore, it is necessary to load all the certificates at all non-leaf nodes of a certificate key tree of the platform into the kernel in advance; and the certificates are written when the kernel is compiled or loaded when the system is started. When the user certificate is illegal, the certificate is refused to be loaded, and all subsequent verifications will fail.

In the container program verifier,
in order to verify the program running in the container, it is necessary to identify different containers in the operating system kernel, and the identification method varies depending on the operating system. In a Linux™ system, the mount namespace id in the kernel may be used to identify different containers in the kernel; when the signature list and user certificate are loaded, the kernel is notified of the mount namespace id corresponding to the container when the container is running.

The timing of verifying the container program is after the program file is loaded into the memory and before the performance of the program file starts. For Linux™ systems, the verification of the container program is performed in a LSM hook including mmap_file and bprm_check_security; the verified files include executable binary programs, dynamic link libraries, and executable scripts; the verification includes checking whether the signature of the program file is in the signature list, as well as verifying whether the signature in the signature list is correct.

In order to improve the efficiency of verification, it is necessary to cache the results of verification, and only verify the signature for unverified program files or changed program files; each container corresponds to a cache, and the same program file on the host may be stored separately in the caches of different containers, thereby avoiding that files on a host shared by different container images affect the verification of the program in the container.

A container platform-oriented trusted software authorization and verification method of an embodiment of the present application includes the following steps:

(1) building a public key infrastructure according to application scenarios, and issuing a user certificate-key pair for each user;

(2) generating container images having identities with the same functions based on the original container image using a digital signature algorithm and the user certificate-key pair in step (1), and pushing the container images to a container image repository for use, wherein each identity includes a user certificate and an original container image signature generated by the user's private key, and subsequently, a container platform will pull the container images from the image repository to start the container;

(3) generating a signature list for the container image using a digital signature algorithm and the user certificate-key pair in step (1) and uploading the signature list to the container platform, wherein the signature list contains programs capable of being run by the container based on the container image;

(4) when the container is created, verifying the identity of the container image built in step (2) to ensure the trustworthiness of the container image; and suspending the creation process of the container when the verification fails;

(5) when the container is started, loading the signature list of the container image built in step (3) and the user certificate in the identity of the container image built in step (2) to an operating system kernel for subsequent verification of programs running in the container; and (6) after loading the programs capable of being run by the container based on the container image and before the programs run, verifying programs in the operating system kernel based on the signature list and user certificate loaded in step (5), and suspending the running of the programs when the verification fails.

The container platform-oriented trusted software authorization and verification method of an embodiment of the present application has at least the following advantages:

(1) The method of the present application guarantees that all container images running on the container platform are trusted by authorizing and verifying container images. Therefore, it may effectively prevent container images carrying malware or those from unknown sources from running on the container platform.

(2) By building an identity for the container and binding the container image to the identity of the container image, the method of the present application is fully compatible with traditional container image management systems and no additional supports are required.

(3) The authorization and verification for the container image of the present application is not designed for a specific container engine and has universality.

(4) The authorization and verification for the container image of the present application ensures that the software running in the container is trusted by authorizing and verifying the program that can be run in the container. Therefore, it can effectively prevent malware from running in the container.

(5) The authorization and verification for the container image of the present application may securely and efficiently verify the programs running in the container by establishing a cache and effectively organizing the signature list, and completing the verification process in the kernel.

DETAILED DESCRIPTION

The present application will be described in detail below in conjunction with the drawings and embodiments.

Figure 2:
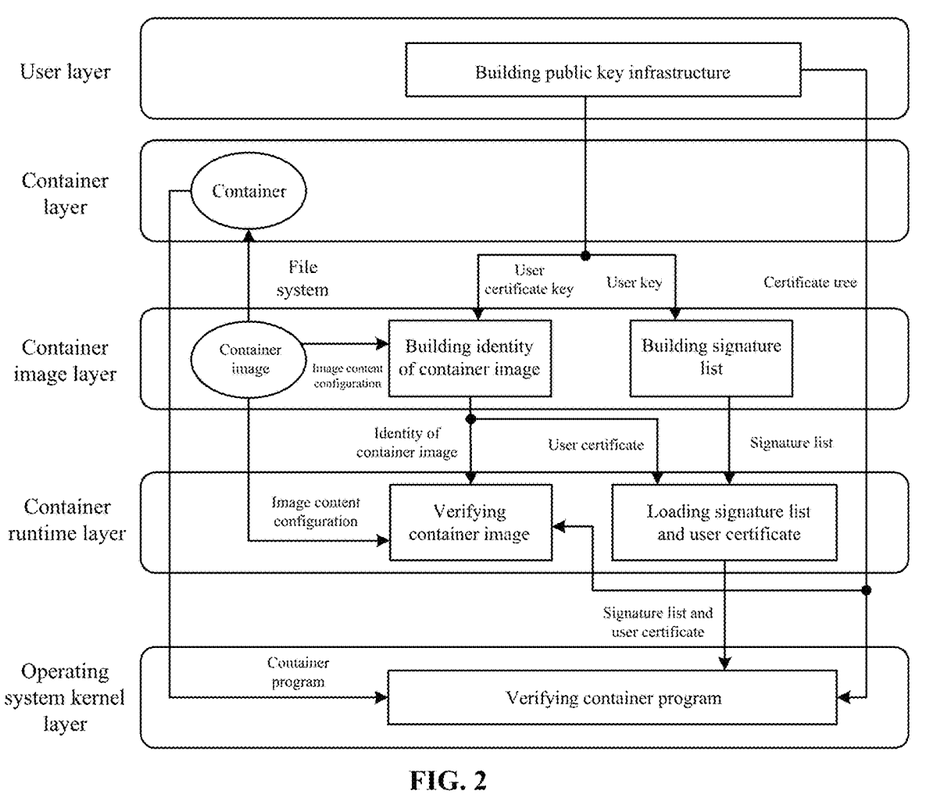
FIG. 2 is a diagram showing an overall architecture of a container platform-oriented trusted software authorization and verification system according to the present application.
Figure 3:
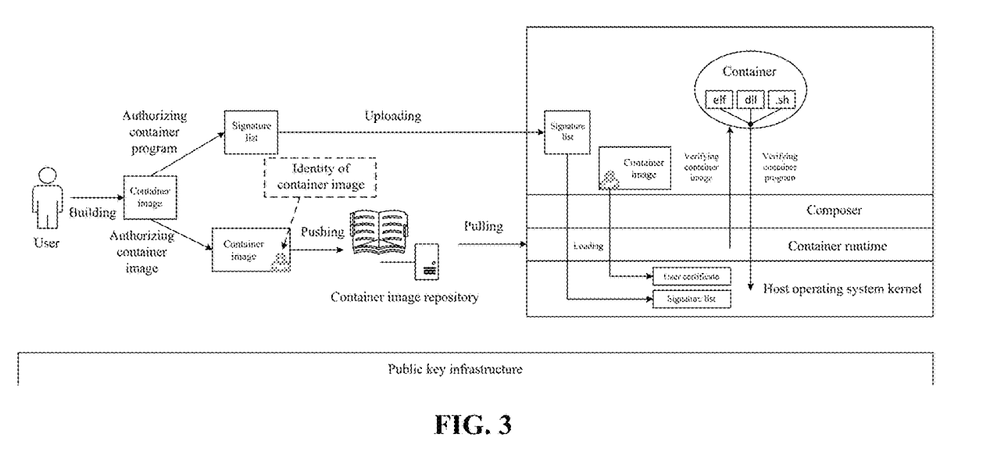
FIG. 3 is a flow chart showing a container platform-oriented trusted software authorization and verification method according to the present application.

As shown in FIGS. 2 and 3, the overall framework of the container platform-oriented trusted software authorization and verification system according to the present application includes: a public key infrastructure builder, a container image identity builder, a signature list builder, a container image verifier, a signature list and user certificates loader, and a container program verifier.

(1) The public key infrastructure builder is configured to build a public key infrastructure, and issue a user certificate-key pair for each user according to different application scenarios. This is the foundation of the entire system.

(2) The container image identity builder is configured to generate container images having identities with same functions based on the original container image using a digital signature algorithm and the user certificate-key pair and push the container images to a container image repository for use.

(3) The signature list builder is configured to generate a signature list for the container image using a digital signature algorithm and a user certificate-key pair and upload the signature list to the container platform. The signature list contains programs capable of being run by the container based on the container image.

(4) The container image verifier is configured to verify the identity of the container image to ensure that the container image is trusted when the container is created. The creation process of the container is suspended when the verification fails.

(5) The signature list and user certificates loader is configured to when the container is started, load the signature list for the container image and a user certificate of a container image producer into a kernel.

(6) The container program verifier is configured to verify programs inside the operating system based on the loaded signature list and user certificate after loading the programs in the container and before the programs run. The running of the programs is suspended when the verification fails.

The six modules of the system will be described in detail below.

(1) Public Key Infrastructure Builder

Figure 4:
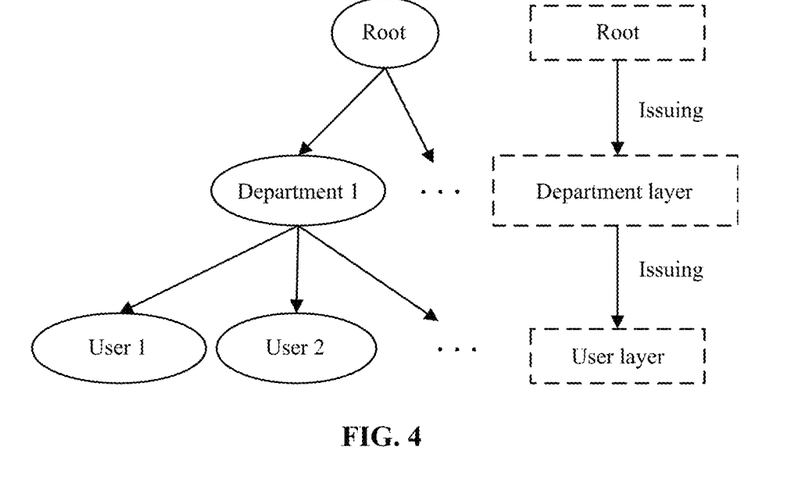
FIG. 4 shows an example of a three-layer certificate key tree according to the present application.

A container service provider needs to build a public key infrastructure, thereby generating a certificate-key pair for each user of the container platform. According to different application scenarios, different certificate key trees need to be built. In the certificate key tree, the root is a self-signed certificate, and the leaf nodes are user certificates; between the root and the leaf nodes, there are a plurality of layers corresponding to different management levels in reality; except for those at the root, the certificates of each layer are issued by an upper layer; organizations of different management levels decide to issue and revoke certificates of the next level in the organization to facilitate management. FIG. 4 shows a three-layer certificate key tree. The three layers in the certificate key tree are a root, a department layer, and a user layer. The root is a self-signed certificate. The certificate of the department layer is issued by the root and the certificate of the user layer is signed and issued by the department. All the private keys in the certificate key tree of the public key infrastructure built by this public key infrastructure builder are offline to ensure the security of the private keys.

(2) Container Image Identity Builder

The container image identity builder is configured to build an identity for each container image to complete the authorization of the container image. The identity for the container image includes two parts. One part is signature for the content of the container image and important configuration made by a user using his own private key and important configuration including, but not limited to, environment variables, ports, startup commands, startup parameters, data volume, working directory, user ID and the like. The other part is user's certificate. The signature contains the integrity information on the container image, and the certificate contains the information on the container image producer. The two parts together constitute the identity of the container image.

The container image is unchangeable. In order to bind the identity of the container image to the container image, the original container image, signature and certificate need to be packaged to obtain a new container image, while a directory must be predetermined in advance, such as /etc/identity/, and the signature and certificate are put in the directory of the new container image and thus the new container image has the same functions and important configuration as the original container image, and also has image identity information. This method is applicable to both layered images (such as Docker images) and non-layered images (such as rkt images), and is universal.

After the container images having identities is built, the user needs to push these images to a container image repository, and subsequently, a container platform will pull the container image from the image repository to start the container.

(3) Signature List Builder

Figure 5:
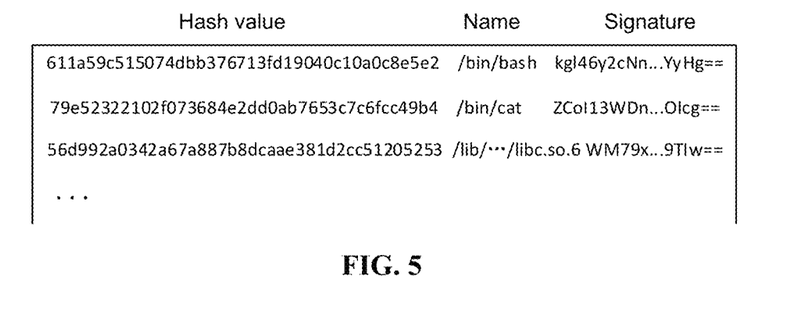
FIG. 5 shows an example of a signature list according to the present application.

For each container image, a signature list is generated to complete the authorization of the container program. The signature list contains all programs capable of being run by the container based on the container image. For each program authorized to be run, the user uses his own private key to calculate the signature of the program file and put the signature into the signature list. Each item in the signature list represents a program, and each item includes but is not limited to the program signature, program hash value, and program name. In addition, the program signature may be represented using a variety of representation methods including binary, base64 encoding, and hexadecimal character strings. FIG. 5 shows an example of a signature list. The signature list contains a plurality of signature items. Each signature item contains three parts, which are program hash value, program name, and program signature. The program hash value is represented by hexadecimal strings, and the program signature is represented by base64 encoding. After the signature list is generated, the user needs to upload the signature list to the container platform. When the container is started, the list and the corresponding user certificate will be together loaded into the kernel for subsequent verification of running programs in the container.

(4) Container Image Verifier

The verification of the container image is performed when the container is created. The verification process includes three steps: a first step, verifying whether a certificate carried by the image belongs to the certificate key tree of the container platform, continuing to a second step of verification when the certificate carried by the image belongs to the certificate key tree of the container platform, and determining that the verification fails when the certificate carried by the image does not belong to the certificate key tree of the container platform, which ensures that the source of the container image is legal. A second step, verifying a signature carried by the image using the certificate on which the verification passes in the first step, wherein the content in the predetermined directory (such as /etc/identity/) needs to be excluded during this step of verification. A third step, verifying the content in the predetermined directory to ensure that the directory (such as /etc/identity/) only contains two files, namely a certificate and a signature file. Above two steps are used for verifying the integrity of the container image and ensure that the content and configuration of the container image have not been tampered.

To speed up the verification of the container image, the hash value maintained by the container engine, such as the sha256 value of each layer of the image maintained by Docker may be used in this step. However, it is unnecessary to use the hash value.

(5) Signature List and User Certificates Loader

The loading of the signature list and certificate is performed only when the verification of the container image passes before all the programs in the container run when the container is started, wherein the startup of the container occurs after the container is created.

Both signature list and certificate are loaded from a user space into a kernel space and written through a file system, for example, a security file system of Linux™; but other methods can also be employed. The file systems used by the container are parts of the host file system, and the container accesses different file systems. Taking Linux™ systems as an example, they use different mount namespaces and root file systems. Therefore, when data are loaded using the file system, data write points should be placed in a directory that only the host may access, thereby preventing the signature list or certificate from being tampered by malware in the container. The writing of the signature list and certificate should be prior to conversion of a host file system to a container file system.

In a kernel, a plurality of data structures are used to organize the signature list, and include a linked list, a doubly linked list, a hash table, a red-black tree, and a radix tree.

When a user certificate is loaded, it is necessary to verify the legality of the user certificate, that is, to verify whether the certificate belongs to the certificate key tree of the container platform. Therefore, it is necessary to load all the certificates at all non-leaf nodes of a certificate key tree of the platform into the kernel in advance. The certificates are written when the kernel is compiled or loaded when the system is started. When the user certificate is illegal, the certificate is refused to be loaded, and all subsequent verifications will fail.

(6) Container Program Verifier

In order to verify the program running in the container, it is necessary to identify different containers in the operating system kernel, and the identification process varies depending on the operating system. In a Linux™ system, the mount namespace id in the kernel may be used to identify different containers in the kernel; when the signature list and user certificate are loaded, the kernel is notified of the mount namespace id corresponding to the container when the container is running.

The verifying of the container program is after the program file is loaded into the memory and before the performance of the program file starts. For Linux™ systems, the verification of the container program is performed in a LSM hook used including mmap_file and bprm_check_security. The verified files include executable binary programs, dynamic link libraries, executable scripts and the like. For Linux™ systems, the binary programs and dynamic link libraries may be verified in the LSM hook mmap_file and the executable scripts may be verified in the mmap_file bprm_check_security. The verification includes checking whether the signature of the program file is in the signature list, as well as verifying whether the signature in the signature list is correct.

Figure 6:
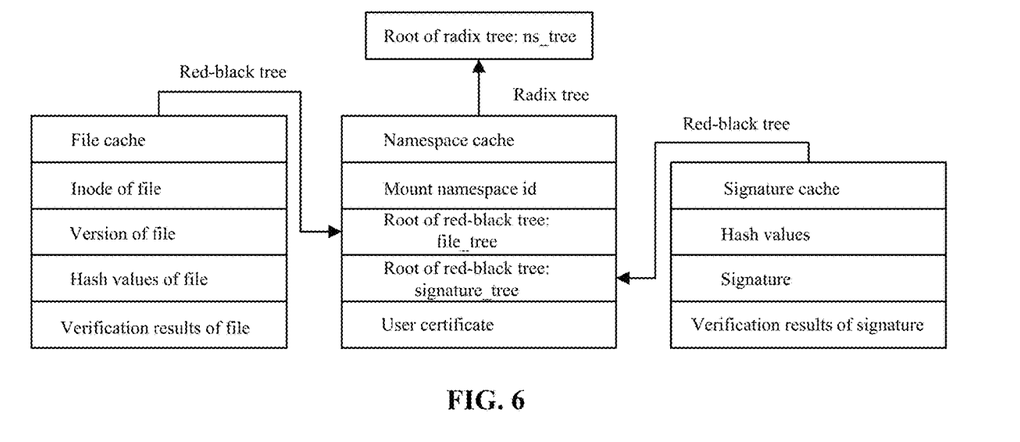
FIG. 6 shows an example of a cache structure according to the present application.

In order to improve the efficiency of verification, it is necessary to cache the results of verification, and only verify the signature for unverified program files or changed program files. Each container corresponds to a cache, and the same program file on the host may be stored separately in the caches of different containers, thereby avoiding that files on a host shared by different container images affect the verification of the program in the container. FIG. 6 shows an example of a cache structure. The cache structure creates three types of caches for each container in the kernel, which are a file cache, a signature cache, and a namespace cache. For each program to be run in the container, a file cache which contains an inode of a file, a version of the file, hash values of the file, and verification results of the file is created; the version of the file is configured to identify whether the file has been modified, and the verification results of the file are configured to record results of verifying the file at the last time; and all files are cached to form a red-black tree, wherein the root is in the namespace cache, and the key is the inode of the file. For each signature item in the signature list, a signature cache which contains hash values of programs, signatures of programs, and verification results of the signature is created; the verification results of the signature are configured to record whether the signatures are valid, avoiding repeated verification of the signatures; and a signature cache for a signature file forms a red-black tree, wherein the root is in the namespace cache, and the key is the program hash value. For each container, a namespace cache which contains a mount namespace id, user certificate of the container, and the root of the file cache and signature cache red-black tree is created; all namespace caches in the kernel form a radix tree, wherein the root is a global variable, and the key is mount namespace id. With the cache structure, the data used by the container program may be effectively organized and verified, and the executable program in the container may be verified securely and efficiently.

In short, software running on the container platform, specifically including container images and programs running in the container is authorized; the source and integrity of the container images and programs running in the container are verified at good time; trustless software is further prevented from running on the platform, which ensures that both container images running on the container platform and the programs running in the container are trusted, thereby improving the security of the container platform.

The above-mentioned embodiments are provided only for the purpose of describing the present application, but are not intended to limit the scope of the present application. The scope of the present application is defined by the appended claims. Various equivalent substitutions and modifications made without departing from the principle of the present application should all fall within the scope of the present application.

The invention claimed is:

1. A container platform-oriented trusted software authorization and verification system, comprising
a public key infrastructure builder, a container image identity builder, a signature list builder, a container image verifier, a signature list and user certificates loader, and a container program verifier, wherein the public key infrastructure builder is configured to build a public key infrastructure, and issue a user certificate-key pair for each user according to different application scenarios;
the container image identity builder is configured to generate container images with a same function as an original container and having identities based on an original container image using a digital signature algorithm and the user certificate-key pair and push the container images to a container image repository for use, wherein each identity comprises a user certificate and an original container image signature generated by a user's private key and subsequently, a container platform will pull the container images from the container image repository to start a container;
the signature list builder is configured to generate a signature list for the container images using a digital signature algorithm and the user certificate-key pair and upload the signature list to the container platform; the signature list containing programs capable of being run by the container based on a container image;
the container image verifier is configured to verify the identity of the container image to ensure the trustworthiness of the container image when the container is created; and suspend a creation process of the container when the verification fails;
the signature list and user certificates loader is configured to load the signature list for the container image and a user certificate of an image producer into an operating system kernel as programs inside the container for verification when the container is started; and the container program verifier is configured to verify programs inside the container based on the loaded signature list and user certificate after loading the programs capable of being run by the container based on the container image and before the programs run, and suspend the running of the programs when the verification fails;
wherein the signature list and user certificates loader is further configured to:
load the signature list and certificate only when the verification of the container image passes before all the programs in the container run when the container is started, wherein the startup of the container occurs after the container is created;
load both signature list and certificate from a user space into a kernel space and write through a file system; when data are loaded using the file system, data write points are placed in a directory that only the host may access, thereby avoiding that the signature list or certificate is tampered by a malware in the container; and
write the signature list and certificate prior to converting a host file system to a container file system.

2. The container platform-oriented trusted software authorization and verification system of claim 1, wherein in the public key infrastructure builder, the building a public key infrastructure, and issuing a user certificate-key pair for each user comprises: building, according to different application scenarios, different certificate key trees in which a root is a self-signed certificate, and leaf nodes are user certificates; between the root and the leaf nodes, there are a plurality of layers corresponding to different management levels; the certificates of each layer are issued by an upper layer except for the certificates at the root; organizations of different management levels decide to issue and revoke certificates of the next level in the organization to facilitate management.

3. The container platform-oriented trusted software authorization and verification system of claim 1, wherein the container image identity builder is configured to:
build an identity of the container image for each container image to complete an authorization of the container image; wherein the identity of the container image comprises signatures for a content of the container image and configuration by a user using the user's own private keys, and the user's certificate; the configuration comprises environment variables, ports, startup commands, startup parameters, data volume, working directory, and user identity (ID); the signature contains the integrity information on the container image, and the certificate contains the information on the container image producer;
wherein the container image is unchangeable; the container image identity builder is configured to package the original container image, signature and certificate to obtain a new container image in order to bind the identity of the container image to the container image; and put the signature and the certificate in a predetermined directory of the new container image, and thus the new container image has the same functions and configuration as the original container image, and also has image identity information.

4. The container platform-oriented trusted software authorization and verification system of claim 1, wherein the signature list builder is configured to generate a signature list for each container image to complete the authorization of the container program; the signature list contains all the programs capable of being run in the container based on the container image; for each program authorized to be run, the user uses his own private key to calculate the signature of the program file and put the signature into the signature list; each item in the signature list represents a program, and each item comprises program signature, program hash value, and program name.

5. The container platform-oriented trusted software authorization and verification system of claim 1, wherein the container image verifier is configured to verify the container image when the container is created; the verification comprises: verifying whether a certificate carried by the image belongs to the certificate key tree of the container platform; continuing verification when the certificate carried by the image belongs to the certificate key tree of the container platform, or determining that the verification fails when the certificate carried by the image does not belong to the certificate key tree of the container platform; verifying a signature carried by the image using the certificate which belongs to the certificate key tree of the container platform, wherein a content in a predetermined directory is excluded during the verification; and verifying the content in the predetermined directory to ensure that the directory only contains a certificate and a signature file; the verification of the signature and the content in the predetermined directory verifies the integrity of the container image and ensures that neither the content nor the configuration of the container image have been tampered.

6. The container platform-oriented trusted software authorization and verification system of claim 1, wherein in the kernel, a plurality of data structures are used to organize the signature list, and the data structures comprise one or more of a linked list, a doubly linked list, a hash table, a red-black tree, and a radix tree.

7. The container platform-oriented trusted software authorization and verification system of claim 1, wherein when a user certificate is loaded, it is necessary to verify the legality of the user certificate, that is, to verify whether the certificate belongs to the certificate key tree of the container platform, wherein all certificates at all non-leaf nodes of a certificate key tree of the platform into the kernel are loaded in advance by writing when the kernel is compiled or loading when the system is started; when the user certificate is illegal, the certificate is refused to be loaded, and all subsequent verifications will fail.

8. The container platform-oriented trusted software authorization and verification system of claim 1, wherein the container program verifier is configured to:
identify different containers in the operating system kernel in order to verify the program running in the container, and an identification process varies depending on the operating system; in a Linux™ system, a mount namespace id in the kernel is used to identify different containers in the kernel.

9. The container platform-oriented trusted software authorization and verification system of claim 8, wherein the container program is verified after the program file is loaded into the memory and before the program file is performed; for Linux™ systems, the verification of the container program is performed in a Linux™ security module (LSM) hook comprising mmap_file and bprm_check_security; the verified files comprise executable binary programs, dynamic link libraries, and executable scripts; the verification comprises checking whether the signature of the program file is in the signature list, as well as verifying whether the signature in the signature list is correct.

10. The container platform-oriented trusted software authorization and verification system of claim 8, wherein the results of verification are cached to improve the efficiency of verification, and only the signature for unverified program files or changed program files is verified; wherein each container corresponds to a cache, and a same program file on the host is stored in caches of different containers, thereby avoiding that files on a host shared by different container images affect the verification of the program in the container.

11. A container platform-oriented trusted software authorization and verification method, comprising:
building a public key infrastructure according to application scenarios and issuing a user certificate-key pair for each user;
generating container images with a same function as an original container and having identities based on an original container image using a digital signature algorithm and the user certificate-key pair, and pushing the container images to a container image repository, wherein each identity comprises a user certificate and an original container image signature generated by a user's private key, and subsequently, a container platform pulls the container images from the container image repository to start a container;
generating a signature list for the container images using a digital signature algorithm and the user certificate-key pair and uploading the signature list to the container platform, wherein the signature list contains programs capable of being run by the container based on a container image;
verifying the identity of the container image when the container is created to ensure the trustworthiness of the container image; and suspending a creation process of the container when the verification fails;
loading the signature list of the container image and the user certificate in the identity of the container image to an operating system kernel for subsequent verification of programs running in the container when the container is started; and
verifying programs in the operating system kernel based on the signature list and user certificate after loading the programs capable of being run by the container based on the container image and before the programs run, and suspending the running of the programs when the verification fails; loading the signature list and certificate only when the verification of the container image passes before all the programs in the container run when the container is started, wherein the startup of the container occurs after the container is created; loading both signature list and certificate from a user space into a kernel space and write through a file system; when data are loaded using the file system, data write points are placed in a directory that only the host may access, thereby avoiding that the signature list or certificate is tampered by a malware in the container; and writing the signature list and certificate prior to converting a host file system to a container file system.

* * * * *